June 25, 1929.  W. J. LEARY  1,718,468
CONDUIT
Original Filed May 22, 1926
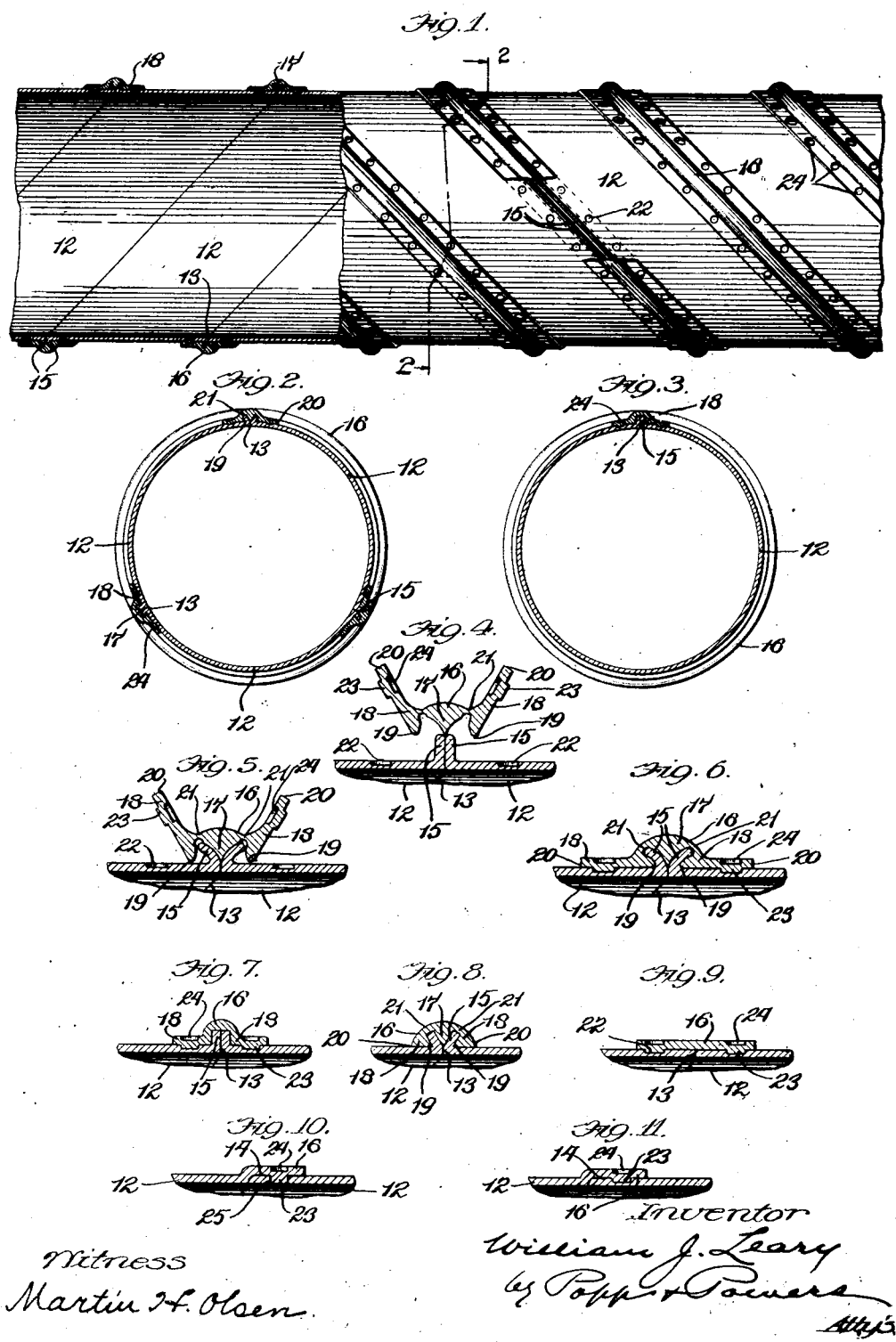
Witness
Martin H. Olsen.
Inventor
William J. Leary
by Popp & Powers
Attys Patented June 25, 1929.

1,718,468

UNITED STATES PATENT OFFICE.

WILLIAM J. LEARY, OF CHICAGO, ILLINOIS.

CONDUIT.

Application filed May 22, 1926, Serial No. 111,071. Renewed November 16, 1928.

This invention relates to a fabricated conduit or pipe and is more particularly intended to be used in installations where a light, strong, durable and tight conduit is necessary or advantageous, as by way of illustration—in conveying water in mines and electric plants, handling the pulp in pulp mills, in conveying the air in vacuum and ventilation systems, conducting the exhaust steam, and numerous other like installations.

One of the objects of this invention is to provide a conduit or pipe constructed of a spirally wound strip of metal which locks the joint between the several turns or convolutions, by a spiral locking band or strip which seals the joint and renders the pipe as strong at the joint as, or stronger than at any other point.

A further object is to provide a locking band which is adapted for use in connection with heavy gage and hard sheet metal and thereby permits the production of large size fabricated pipe having a fraction of the weight of cast metal pipes, and a consequent reduction in the cost of transporting and installing the pipe.

Still further objects are to provide such a conduit which is reliably sealed, which will reliably resist strains without impairment, and which can be easily cut to any desired length thereby reducing the number of couplings required.

In the accompanying drawings:

Figure 1 is a side view of a length of pipe showing the preferred form of my invention, the same being shown partly in section and partly in elevation.

Figure 2 is a cross section on line 2—2, Fig. 1.

Figure 3 is a cross section of a conduit made of one strip of metal and showing a modified form of the joint shown in Fig. 1.

Figures 4, 5 and 6 are enlarged fragmentary longitudinal sections of the preferred form of joint shown in Fig. 1, and showing successive stages in the application of the locking band.

Figure 7 is a view similar to Fig. 6 showing the modified form of joint shown in Fig. 3.

Figures 8, 9, 10 and 11 are views similar to Fig. 7 and showing different modified forms of my invention.

The body of the conduit is composed of one or more strips 12 of sheet metal which are preferably hard and strong, so as to be capable of withstanding any strains to which it may be subjected. By employing a hard metal, the conduit is adapted to be used for a greater variety of purposes than if a soft and more easily worked metal were used. Hard metal resists the abrasive action of sand and grit, consequently reducing the wear on the walls of the conduit and insuring a greater life for the same. Where resistance to corrosion is desirable and the work warrants the cost, Monel metal or similar alloys may be employed. The strips may also be made of corrosive metal and the latter protected against rusting by galvanizing, coating with asphaltum or other suitable protective coating. The metal may be so treated before or after the same is fabricated and when so treated after it has been made up, the coating aids in closing the joints between the strips and insures a tighter joint. Each of these strips is wound helically or spirally so that the opposing edges of adjacent convolutions or turns fit closely together and form a comparatively tight joint.

In the construction shown in Figs. 1 to 9, the adjacent edges of the convolutions or turns of the tubular body abut against each other and form a butt joint 13, while in Figs. 10 and 11 the adjacent edges of these convolutions are connected by a lap joint 14.

The strips of metal 12 used in making the body portion of the conduit may vary in width and thickness and either a single strip of metal can be used as shown in Fig. 3, or a plurality of strips may be employed side by side as shown in Figs. 1 and 2, in which case the lead of the convolutions may be increased. Good practice dictates that a long spiral lead makes a much stronger and stiffer pipe than a short lead. Although a short lead may be used in winding the strips it is preferable to make the leads as long as practical in order to avoid fracturing the metal or destroying the fibrous structure thereof, which would be liable to occur if the metal were crimped or bent abruptly.

In the preferred form of my invention, shown in Figs. 1, 2, 4, 5 and 6 each of the strips 12 is provided at its opposite edges with flanges 15 which, before the locking band 16 is applied, project radially outward and abut on their corresponding outer sides as shown in Fig. 4. The locking band 16 is wound spirally on the fabricated conduit over the joint 13, the winding of the strips and locking band preferably being part of the continuous operation of the forming machine.

The locking band 16 is formed at its center to provide a longitudinally extending wedging portion 17 and at its opposite sides with longitudinally extending side portions 18, each of which before being applied to the body of the conduit, extend at an angle to the central wedging section 17, as shown in Fig. 4, and is connected intermediate its inner and outer edges 19 and 20, to the central wedging portion by a web 21 which permits the side portions to be flattened out.

In applying the locking band, the same is fed so as to bring the apex of its central wedging portion 16 between the flanges 15 as shown in Fig. 4. The central wedge portion is then rolled so as to press the same down between the flanges as shown in Figure 5, thereby spreading these flanges at their upper ends. In the next operation, the side portions 18 are rolled down on the body of the conduit, the same turning about the webs 21 as an axis which rolling operation forces the inner edges 19 of these side portions under the turned flanges 15, and against the under sides thereof, the same being thereby forced together and forming a tight joint. If desired, previous to the final rolling of the conduit, solder can be placed between the band and the conduit body thereby further sealing the joint against leakage. The joint can also be soldered after the tube is completed.

In order to prevent circumferential displacement of the locking band and also to add to the strength and tightness of the joint, each of the strips 12 is provided adjacent to its two edges with a plurality of circular recesses 22, suitably formed on the exterior side of the strip and spaced the entire length of the same. The locking strip 16 is similarly provided with a plurality of lugs or bosses 23 spaced along the inner side of the side portions 18, thereof, which lugs are adapted to engage the corresponding recesses in the conduit body as best shown in Fig. 6, thereby adding to the security of the joint. These lugs 23 are preferably stamped or punched from the locking band, leaving corresponding recesses 24 on the upper side thereof. These lugs 23 and recesses 22 are not necessary to produce a reliable joint, however, and if desired they may be omitted as shown in Fig. 8, the finished band being semi-circular in cross section.

In the modification shown in Figs. 3 and 7, the central wedging portion 17 of the locking band is omitted, and the flanges 15 are not spread apart as in the preferred construction, the application of the locking band to the conduit being similar in all other respects to the preferred construction.

In the modifications shown in Fig. 9, the body strips 12 are not provided with flanges, the locking band 16 being made flat and suitably secured to each of the strips on opposite sides of the joint or seam. As shown in Fig. 9, this may be accomplished by providing a flat band which is provided adjacent each of its edges with lugs 23 spaced along the same and which engage circular recesses 22 provided along the edge of the strip 12. In this construction, a positive lock against circumferential and lengthwise displacement of the band on the conduit, is provided. In the forms shown in Figs. 10 and 11, one edge of the body strip 12 may be made integral with the connecting member or strip 16 at one edge of the body strip, the connecting member or strip being offset outwardly from the body of the strip, forming a lap joint with the corresponding edge of the adjacent turn of the conduit. This band or offset portion may be secured to the adjacent convolution by the lug and recess connection shown in the preferred form and in Fig. 9, or if desired, the strip may be provided with holes 25 instead of the recesses 22, as shown in Fig. 10, the lugs on the locking band being made sufficiently high to extend through to the inner side of the conduit and form a smooth surface therein.

All of the several forms of my invention permit of making the conduit of considerably harder and heavier gage metal than would otherwise be possible as heavy gage and hard metal such as required for strength and wearing qualities in the present case cannot be folded or seam-jointed especially when the strips of metal are wound spirally or helically. Also, in all of the forms, the bands or connecting members may be brazed or soldered to the conduit thereby further insuring a tight joint and also adding to the strength of the pipe at the joints.

This conduit also possesses great rigidity and durability, the seams are reliably sealed and not liable to leak or give when subjected to strains, the same is very light and can be produced at comparatively low cost.

I claim as my invention:—

1. A conduit comprising a helical metal body, a spiral band, overlying the spiral joint between the convolutions thereof, said convolutions and band being provided with depressed and raised portions respectively, adapted to interengage and lock the same together.

2. A conduit comprising a strip of metal wound helically, a spiral locking strip overlying the spiral joint between the several convolutions formed by said helical strip, one of said strips having laterally projecting portions embedded in the body of the other strip and interlocking said convolutions.

3. A conduit comprising a helical metal body, and a spiral locking band overlying the joint between the several convolutions thereof, said locking band being provided with a plurality of lugs spaced along its length, said lugs being received in a plurality of recesses spaced along the edge of the several convolutions of said conduit and interlocking said convolutions and band.

4. A conduit comprising a helical metal body the convolutions of which have laterally projecting flanges at their opposite edges and a plurality of recesses spaced along the edge of said convolutions, and a spiral locking band overlying the joint between the several convolutions thereof, said locking band having a central longitudinally extending wedging portion holding the outer ends of said flanges apart, side portions, and a web connecting said central wedge portion and said edge portions, each of said edge portions engaging the side of said conduit and the under sides of said flanges and holding the several convolutions together; and said edge portion having a plurality of lugs spaced along its length and engaging said recesses of said convolutions.

In testimony whereof I hereby affix my signature.

WILLIAM J. LEARY.